June 15, 1954     E. H. MUDERSBACH     2,681,209

SUCTION DEVICE FOR ROTARY REGENERATIVE PREHEATERS

Filed Jan. 31, 1950

INVENTOR.
Ernst H. Mudersbach
BY Jarvis C. Markle
his Attorney

Patented June 15, 1954

2,681,209

UNITED STATES PATENT OFFICE 2,681,209

SUCTION DEVICE FOR ROTARY REGENERATIVE PREHEATERS

Ernst H. Mudersbach, Heidelberg, Germany, assignor, by mesne assignments, to Jarvis C. Marble, New York, N. Y., Leslie M. Merrill, Westfield, N. J., and Percy H. Batten, Racine, Wis., as trustees Application January 31, 1950, Serial No. 141,421

Claims priority, application Germany February 9, 1949

5 Claims. (Cl. 257—6)

This invention relates to rotary regenerative air preheaters particularly of the Ljungstrom type.

A conventional regenerative air preheater of the above type includes a rotor carrying heat transfer material in the form of metal plates which are firstly positioned in a flue gas passage to absorb heat and then, upon rotation of the rotor, become located in an air flow passage to impart heat to air flowing therethrough.

In such air preheaters the flow of leakage air into the flue gas passage from the air passage should be maintained as small as possible since with increase of the volume in the flue gas passage, particularly the dust collecting device becomes additionally loaded and thereby the dust collecting efficiency will become impaired. Moreover due to the additional mass of heated air and flue gas the power consumption of the suction device moving the flue gas will be considerably increased.

In regenerative air preheaters having a rotating heat transfer mass, losses due to air leakage can be considerably decreased by maintaining small clearances between the stationary and movable elements by the use of movable sealing members. It is, however, impossible to eliminate such leakage losses completely.

The sector-shaped compartments of the rotor containing the heat transfer mass are normally separated from the two passages for flue gas and air by means of sector-shaped plates disposed one at each face of the rotor at the zones between the passages. Thus the air which has a higher pressure than the flue gas can flow into the flue gas passage only through the clearances abovementioned which are adjustable. On rotation of the rotor, however, the mass of air filling the compartments at the transition zones from gas to air or vice versa will be carried over to the adjacent passage and this carry-over cannot be avoided by using any mechanical sealing device.

The object of this invention is to provide a construction of air preheater which will reduce the transport of air from the air passage to the flue gas passage.

According to the present invention in a regenerative preheater of the rotary type for air or other gaseous media, air, which due to being carried over within the rotor and to passing through existing clearances adjacent sealing members thereof, tends to flow over to the gas passage, is subjected, before entering the gas passage, to suction created by a reduced pressure and is sucked away at least in part.

The invention will be hereinafter more fully described with reference to the accompanying drawing showing a preferred embodiment thereof, and in which.

Figure 1:
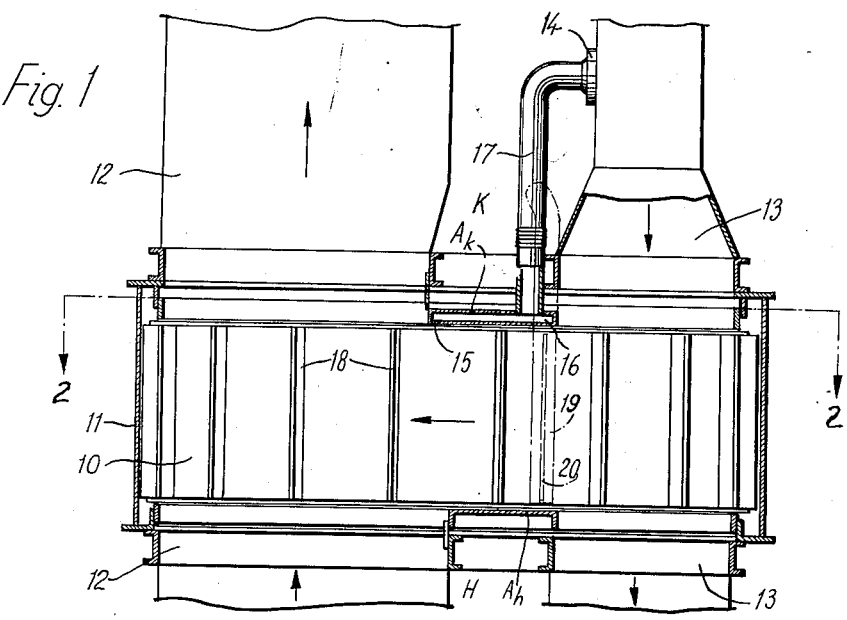
Fig. 1 shows an elevational view partly in section of a regenerative air preheater of the Ljungstrom type.
Figure 2:
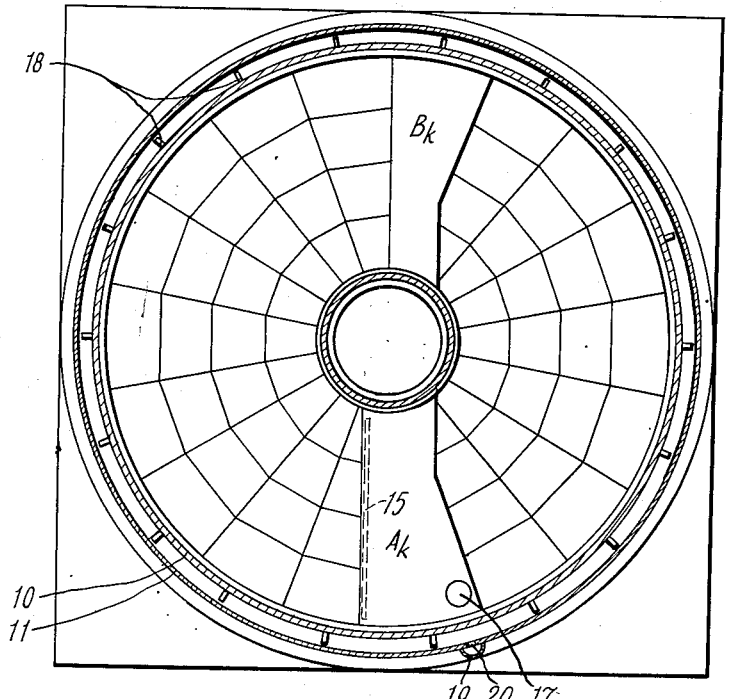
Fig. 2 shows a horizontal section through the casing of the air preheater approximately along the line 2—2 of Fig. 1.

Referring to the drawings, the preheater comprises a rotor 10 divided into sector-shaped compartments each containing a heat transfer mass and rotatable within an outer casing 11. On one side of the axis of the rotor a flue gas passage designated by 12 is disposed and on the opposite side of the axis an air flow passage 13 is arranged. Air is caused to flow through said passage by means of a blower shown diagrammatically at 14.

Reckoned in the direction of the flow of flue gas through the passage 12, as shown by the arrows, the front face H of the preheater is termed the "hot" face and the rear face K of the preheater is designated as the "cold" face. The two superimposed sector plates between which the sector-shaped compartments of the rotor 10 containing the heat transfer mass pass from the air passage to the gas passage, are designated by $Ah$, $Ak$. The other two superimposed sector plates between which the rotor compartments pass from the gas passage to the air passage are designated by $Bh$ and $Bk$.

At the zone defined between the plates $Ah$ and $Ak$, air contained in the sector-shaped compartments of the rotor will be carried over into the gas passage whereas at the zone defined between the plates $Bh$ and $Bk$ flue gas is transported into the air passage. Due to the high pressure prevailing in the air passage the flow of leakage air at the zone A passes in the same direction as the carry-over air so that the two air flows at this zone are additive.

At the carry-over zone B the leakage air passing through the clearance spaces will pass in a direction opposite to the direction of rotation of the rotor 10 and thus opposite to the direction of flow of the carry-over gas. The leakage air enters the carry-over compartments of the rotor filled with gas and forces the gas back towards the flue gas passage. The two flows thus act in directions opposite to each other and under certain conditions they may be arranged to neutralize one another completely. The sector compartments passing into the air passage at this transition zone will thus carry the leakage air which has previously entered the same, back to the air passage.

At the zone A leakage air that has passed over both the hot and the cold faces of the air preheater, together with the carry-over air, would normally be transported into the flue gas passage. The entry of air into said passage is limited to a thin current at the separating sector plate Ak. The thickness of this air current as it enters the passage 12 depends on the rotational speed of the rotor 10 and on the velocity of the flue gases within the passage 12.

In accordance with the invention the sector plate Ak is formed as much larger than the normal sector plate as the thickness of said air current and the plate is provided at one of its edges with a slit-shaped opening 15 extending along the entire length of the sector plate Ak. All leakage air must pass through the slit 15 before reaching the flue gas passage 12. Disposed on the outer face of sector plate Ak is a chamber 16 which is in communication through a conduit 17 with a fan adapted to produce a somewhat higher vacuum than that prevailing in the flue gas passage 12. Preferably the conduit 17 communicates with the suction side of the blower 14. In consequence air passes through the slit 15 and is sucked through conduit 17 back into the air passage 13.

In a similar manner leakage air which may have passed through a peripheral sealing device at the outer periphery of the rotor into the space intermediate the rotor jacket and the outer casing 11 will be sucked from this space adjacent the zone A. For this purpose the rotor jacket carries opposite each sector-shaped compartment a plate strip 18 by means of which the air present in the annular space will be carried to the proximity of the sector plates A and there sucked out into the conduit 17. The air withdrawn through the suction conduit 17 is to some extent heated and on mixing with the fresh air drawn in by the blower 14 increases the temperature of the air stream passing through the passage 13.

I claim:

1. A regenerative heat exchanger comprising a stationary casing structure comprising a cylindrical wall and end-plate structure comprising sector plates extending from the central portion of said casing structure to said wall at both ends of the casing structure, whereby to provide a first passage for flow through said casing structure of a first gaseous medium to be heated and a second passage for flow through said casing structure of a second and different gaseous heating medium of lower pressure than said first medium, a rotor mounted in said casing having a plurality of sector like compartments carrying regenerative heat exchange material, said rotor being located so that said compartments traverse said passages successively and move between said sector plates to pass directly from one to the other of said passages, means providing a channel communicating with said rotor along the edge portion of at least one of said sector plates on the side thereof adjacent to the passage for said second medium, and means for maintaining said channel under a reduced pressure for removing from the preheater fluid tending to leak through the space between the rotor and the sector plate from said first passage to said second passage.

2. A structure as set forth in claim 1 including a fan for forcing said first fluid through said first passage, and in which said channel communicates with the suction side of said fan, whereby to maintain said reduced pressure in the channel.

3. A structure as set forth in claim 2 in which the medium removed from said channel is mingled with the medium forced by the fan through said first passage.

4. A structure as set forth in claim 1 including means providing a chamber outside and adjacent to the sector plate with which said channel communicates, said chamber communicating with the rotor through a slot in the sector plate.

5. A structure as set forth in claim 1 in which said rotor has a cylindrical wall spaced radially inwardly from said wall of said casing structure and in which the cylindrical wall of the rotor is provided with a plurality of circumferentially spaced axially extending fins projecting from the rotor to closely adjacent said cylindrical wall portion of the casing, whereby to divide the space between the walls into a series of compartments moving with the rotor and coming into communication with said channel of reduced pressure as the compartments pass said sector plate.

References Cited in the file of this patent

UNITED STATES PATENTS

| Number | Name | Date |
| --- | --- | --- |
| 1,649,605 | Ljungstrom et al. | Nov. 15, 1927 |
| 1,829,996 | Lysolm et al. | Nov. 3, 1931 |
| 1,970,127 | Colby et al. | Aug. 14, 1934 |
| 2,337,907 | Lundstrom | Dec. 28, 1943 |
| 2,468,826 | Karlsson et al. | May 3, 1949 |
| 2,499,358 | Cooper et al. | Mar. 7, 1950 |